United States Patent Office 2,868,990
Patented Jan. 13, 1959

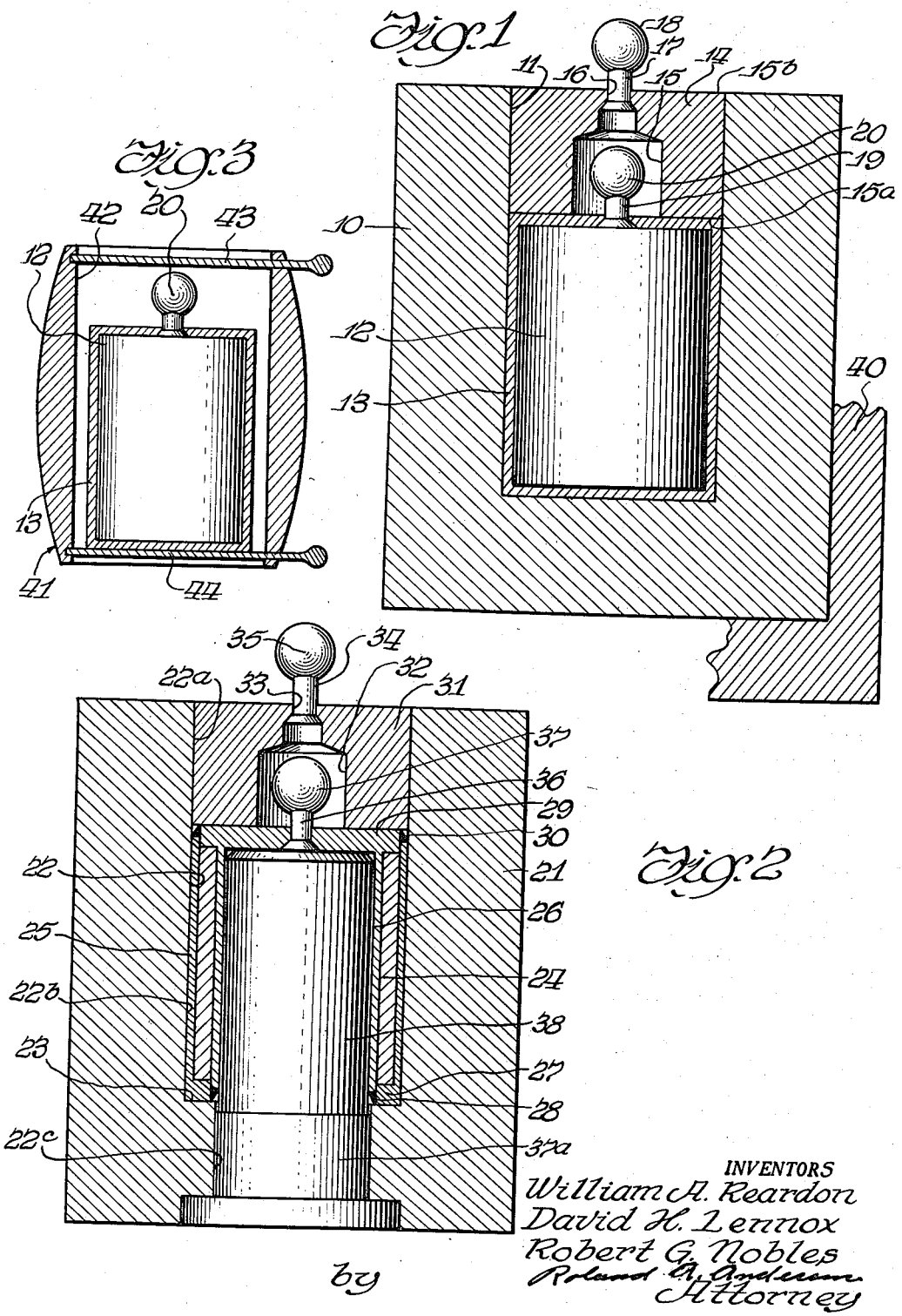

2,868,990

NEUTRON SOURCE

William A. Reardon, Park Forest, David H. Lennox, Chicago, and Robert G. Nobles, Lemont, Ill., assignors to the United States of America as represented by the United States Atomic Energy Commission Application December 12, 1955, Serial No. 552,668

4 Claims. (Cl. 250—84.5)

This invention relates to a new and improved neutron source and to a method for activating the source.

Relatively small compact neutron sources are widely employed at the present time in experimental work; for example, in the determination of neutron cross sections and in experiments involving the use of an exponential pile.

The neutron sources employed are of two kinds: one kind consists of a combination of an alpha emitter, such as radium or polonium, and a light element, such as beryllium or boron; the other kind involves the photonuclear reaction in which an emitter of gamma rays of sufficiently high energy, such as the artificially produced isotopes $Na^{24}$, $Ga^{72}$, $Sb^{124}$, or $La^{140}$, is employed in combination with a target material such as beryllium or heavy water.

In carrying out experiments in an exponential pile, a neutron source is placed at the bottom of a pile structure built up with a particular geometry of fissionable material and moderator of such size that a self-sustained neutronic chain reaction is impossible. Measurement of the neutron density in various parts of the pile as the geometry or materials included in the pile are changed permits a determination of lattice constants.

It would be desirable to employ a neutron source in these experiments which is both permanent and inexpensive. Unfortunately the sources which are relatively permanent, such as the radium-beryllium source, are extremely expensive. For example, radium-beryllium sources cost approximately $20,000 per curie.

Most of the photonuclear sources have a relatively short life. An antimony-beryllium source, however, has a useful life of sufficient duration to be of practical use, and it is to such a neutron source that this invention relates.

The radioactive $Sb^{124}$ isotope is obtained by irradiating naturally occurring antimony with neutrons in a neutronic reactor. The reaction is $Sb^{123}$ $(n,\gamma)$ $Sb^{124}$. When the source is activated and assembled, the gamma rays emitted by the $Sb^{124}$ strike the target material which thereupon emits neutrons in accordance with the reaction $Be^9(\gamma,n)$ $Be^8$.

As the radioactive $Sb^{124}$ isotope has a half life of but 60 days, the source must be rejuvenated by further exposure of the antimony to the neutron flux in a neutronic reactor at fairly frequent intervals. The usual method for activation of antimony-beryllium, and similar sources, was to assemble the source first and then irradiate it in a neutronic reactor, and after use the entire source was placed within a reactor for rejuvenation. As high intensity gamma and neutron radiation is emitted by the source, bulky shielding is necessary when conveying the source from the rejuvenating reactor to the place it is to be used. Any handling of the source, including its destruction, must be carried out in a "hot" laboratory where shielding is available to protect personnel against high intensity gamma and neutron radiation.

It is accordingly an object of our invention to provide a relatively low cost neutron source, and one which can be easily activated and handled with comparatively little radiation shielding.

It is also an object of our invention to provide a high-intensity neutron source which combines high efficiency with ease of activation.

It is a further object of our invention to provide a method of activating and handling a high-intensity neutron source which does not require the use of a "hot" laboratory.

These and other objects of the invention are attained by our novel antimony-beryllium neutron source in which an antimony cylinder is slidably disposed within a mass of beryllium so that the neutron source may be readily activated and deactivated.

Reference is now made to the accompanying drawing wherein:

Figure 1 is a vertical cross sectional view of one embodiment of our novel neutron source along with which is shown a portion of a shield in which the source may be stored;

Figure 2 is a vertical cross sectional view of a second embodiment of our novel neutron source; and Figure 3 shows in reduced size a vertical cross sectional view of the antimony cylinder of the embodiment of Figure 1 as stored in a movable protective shield to illustrate one step in the activation of a neutron source.

Referring now to Figure 1, a rectangular block 10 machined from beryllium has a cylindrical recess 11 extending therein from one surface thereof. A solid cylinder 12 of antimony is slidably disposed within the recess 11 so as to be centrally located within the beryllium block. This antimony cylinder 12 is encased in a fluid-tight aluminum casing 13. A beryllium plug 14 is slidably disposed within the recess 11 so that the antimony cylinder 12 is completely enclosed within a beryllium mass. The plug 14 has a recess 15 in the lower face 15a thereof. A narrow aperture 16 connects the top face 15b of the plug with the recess 15. A stud 17 provided with a small ball 18 on one end thereof and with the other end anchored within the aperture 16 is provided so that the plug 14 can be readily removed and replaced by means of a remote control manipulator. The stud 17 may be formed of aluminum and therefor may be secured within the aperture 16 by a blow on the end of the stud 17 confronting the recess 15.

A stud 19 with a small ball 20 at one end thereof is attached to the casing 13 in the same manner that the stud 17 is attached to the plug 14 so that the antimony cylinder 12 may be readily inserted and withdrawn from the block 10 by a remote control manipulator. The small ball 20 is disposed within the recess 15 in the beryllium plug 14, as shown.

One of the advantages to be derived from the above described neutron source arises from the fact that, although comparatively inexpensive, the source is of high intensity. The source is inexpensive because of the materials used and because it can be prepared and handled easily without requiring the use of bulky radiation shielding.

In one construction of this embodiment of the invention, the neutron source has a beryllium block 10 which is 2¾" by 2¾" by 3⅛" and an antimony cylinder 12 which is 1.19" in diameter and 1.50" in length. The beryllium block 10 weighs 650 grams and the antimony cylinder 12 weighs 185 grams. After irradiating the antimony cylinder 12 in a reactor having an average neutron flux of $2 \times 10^{13}$ neutrons/cm.² second for 48 hours and assembling the source, the measured neutron yield from the source is $2 \times 10^8$ neutrons/second.

The method of assembly and use of this source follows. The beryllium block 10 is stored in a shield 40 which is capable of stopping both neutron and gamma radiation. The antimony cylinder 12 is irradiated in a neutronic reactor for a period of several days. This time depends on the neutron flux available, the amount of antimony to be irradiated, and the degree of activation desired. The antimony cylinder 12 has previously been encased in the aluminum casing 13 to prevent possible contamination of the reactor and of the surroundings.

The cylinder 12 is then permitted to "cool off" for a period of time sufficient to permit the radiation emanating from the aluminum casing to become negligible which requires a few hours. Thereupon the cylinder 12 is placed within a movable protective shield 41 which consists in general of a vertical channel 42 through the material of the shield and upper and lower slides 43 and 44 respectively to act as upper and lower closures for the channel. As there is no neutron radiation until the source is assembled, a considerable reduction in the bulk of this shielding is possible, thereby permitting a considerable saving in the time and cost of handling.

The portable shield 41 is conveyed to the shield 40 carrying the beryllium block 10 and is located over the beryllium block contained therein. After removing the upper closure 43 a remote control manipulator is employed to grasp and hold the antimony cylinder by the aluminum ball 20, the lowermost closure 44 is pulled out and the antimony cylinder is lowered into position in the beryllium block 10. By the same means the beryllium plug 14 is lowered into position.

It is not until the antimony and beryllium are brought together that there is any neutron radiation. At this time the source is within a shield which need not be portable. The neutron source is now ready for use and may for example be readily inserted into an exponential pile to carry out exponential experiments.

In removing the neutron source this procedure is reversed. Once the antimony cylinder 12 is removed from the beryllium block 10 neutron emission ceases and portable shielding can be used for conveying the antimony cylinder 12 to the reactor for rejuvenation or to a place of storage if the source is no longer needed.

A second embodiment of the invention is shown in Figure 2. In this embodiment of the invention a rectangular block 21 of beryllium has a cylindrical channel 22 extending therethrough. This channel 22 has three distinct adjacent portions denoted by the numbers 22a, 22b, and 22c. Portions 22a and 22b (in the specific embodiment shown) are of the same diameter although it is obvious that portion 22a could be of larger diameter than portion 22b if so desired. The lower portion 22c of the channel is of smaller diameter than are the other portions forming a shoulder 23. A hollow antimony cylinder 24 is slidably disposed in the channel 22 in portion 22b so as to rest on shoulder 23. The antimony cylinder 24 is completely encased in aluminum which casing takes the form of an outer cylinder 25 of aluminum and inner cylinder 26 of aluminum. The outer cylinder 25 has an annular inwardly extending foot 27 which is welded to the inner cylinder 26 by an annular weld 28. The inner cylinder 26 depends from an aluminum disk 29 which covers the entire antimony cylinder 24 and is welded to outer cylinder 25 by an annular weld 30.

A first beryllium plug 31 is slidably disposed in portion 22a of the channel 22. This plug 31 has a recess 32 formed therein, an aperture 33, and can be handled by means of a stud 34 provided with a small ball 35 on the end thereof, all of which is identical to the construction shown in Figure 1. The antimony cylinder 24 is likewise conveyed by means of a stud 36, provided with a ball 37 on the end thereof. This stud 36 passes through and is attached to the aluminum disk 29.

A second plug 37a is press fitted into place in portion 22c of the channel 22. This plug 37a has a cylindrical extension 38 that extends up into and substantially fills the space within the hollow antimony cylinder 24.

A specific neutron source constructed according to this embodiment of the invention has a beryllium block which is 2¾" by 2¾" by 3⅛" and an antimony cylinder which is 1.19" in exterior diameter, 1.00" in interior diameter, and 1.502" in length.

The beryllium used in the source weighs 678 grams and the antimony weighs 52 grams.

After irradiating the antimony cylinder 24 in a reactor having an average neutron flux of $2 \times 10^{13}$ neutrons/centimeter$^2$ second for 96 hours, the activity was found to be $8 \times 10^7$ neutrons/second. The difference in activity is caused by the fact that this source contains a mass of antimony less than a third the weight of that used in the first embodiment.

It would of course be possible to employ an integral mass of beryllium in place of the separate beryllium block 21 and plug 37a.

This latter embodiment of the invention represents an efficient and desirable form of the invention. As there is a core of beryllium within the hollow cylinder, as well as a mass of beryllium surrounding the hollow cylinder, the gamma rays emanating from the antimony do not have to traverse a large mass of antimony before striking the beryllium. Therefore for a given mass of antimony a source having a higher intensity is obtained by forming the antimony in the form of a hollow cylinder than is obtained by employing a solid mass of antimony.

It has been emphasized that the antimony cylinders 12 and 24 and the beryllium plugs 14 and 31 are slidably disposed within the mass of beryllium. As these elements must be handled by a remote control manipulator, it will be obvious that sufficient clearance must be supplied between the removable elements and the walls of the channel so that the removable elements can be readily dropped into the mass of beryllium without undue difficulty by a manipulator.

The manufacture of this neutron source can be easily accomplished in any machine shop equipped to handle materials such as baryllium because there is no radioactivity to consider while carrying out the machining. There is no neutron hazard to consider until the source is assembled within the shield 40 as the design permits the antimony to be irradiated separately. The lack of neutron hazard permits a considerable reduction in the bulk of shielding necessary prior to final assembly which may be at the place the source is to be used. The bulk of shielding required with previous antimony-beryllium sources made it necessary to handle the sources in a "hot" laboratory and then provide sufficient shielding to protect personnel against both gamma and high intensity neutron radiation while carrying the assembled source to an exponential pile or other place of employment.

The savings due to the form and method of construction of this type of neutron source reduces the cost of such a source to approximately $250.00 per 100 curies which makes it practical to use the source even though it must be rejuvenated at fairly frequent intervals.

While this invention has been described with reference to specific embodiments thereof, it will be understood that various modifications coming within the scope of the invention may be utilized, and it is intended that the appended claims shall cover all such modifications as fall within the true spirit and scope of the invention.

What is claimed is:

1. A neutron source comprising, in combination, a solid mass of beryllium having a cylindrical recess extending therein from one surface thereof, a cylinder composed at least partially of antimony-124 slidably disposed within the cylindrical recess, a fluid-tight aluminum casing disposed about the antimony cylinder, a beryllium plug slidably disposed in the recess to completely enclose the antimony cylinder in beryllium, said beryllium plug having a recess adjacent to the antimony cylinder, and a stud attached to the antimony cylinder protruding into the recess of the plug.

2. A neutron source comprising, in combination, a solid mass of beryllium having a cylindrical recess extending therein from one surface thereof, a solid cylinder composed at least partially of antimony-124 slidably disposed within the cylindrical recess, a fluid-tight aluminum casing disposed about the antimony cylinder, a beryllium plug slidably disposed in the recess to completely enclose the antimony cylinder in beryllium, said beryllium plug having a recess adjacent to the antimony cylinder, a stud attached to the antimony cylinder protruding into the recess of the plug, and a stud attached to the beryllium plug.

3. A neutron source comprising, in combination, a solid mass of beryllium having a recess extending therein from one surface thereof, said recess having a cylindrical portion adjacent to the surface of the beryllium mass and a cylindrical slot extending coaxially from the cylindrical portion, a hollow cylinder composed at least partially of antimony-124 slidably disposed within the cylindrical slot, an aluminum fluid-tight casing for the hollow cylinder, a beryllium plug slidably disposed in the cylindrical portion of the recess having a recess adjacent to the hollow cylinder, and a stud attached to the hollow cylinder protruding into the recess of the plug.

4. A neutron source comprising, in combination, a solid mass of beryllium having a cylindrical recess extending therein from one surface thereof to the opposite surface thereof having portions of different diameter, an annular shoulder disposed between a portion of the recess of greater diameter and a portion of less diameter, a hollow cylinder composed at least partially of antimony-124 slidably disposed within the portion of the recess of greater diameter and resting on the annular shoulder, a fluid-tight aluminum casing for the hollow cylinder, a first beryllium plug slidably disposed within the portion of the recess of greater diameter, said beryllium plug having a recess adjacent to the antimony cylinder, a stud attached to the antimony cylinder protruding into the recess of the plug, a stud attached to the said first beryllium plug, and a second beryllium plug in the portion of the cylindrical recess of less diameter and protruding into the space within the hollow antimony cylinder.

References Cited in the file of this patent

"National Research Council Committee on Nuclear Science," Nuclear Science Series, Preliminary Report No. 6, Photo-Neutron Sources by A. Wattenberg, July 1949, pp. 4, 7 (that is, Fig. 1), 8, 11, 12 (that is, Fig. 3), 13.

Nuclear Energy Techniques, publ. by Nucleonics, McGraw-Hill Publ., New York, Patent Office Library, date Nov. 27, 1951.

The Reactor Handbook, vol. I (Physics), U. S. Atomic Energy Commission declassified edition, February 1955, pp. 5–11.